United States Patent [19]

Seno et al.

[11] Patent Number: 4,745,295

[45] Date of Patent: May 17, 1988

[54] ATTITUDE DETECTING ARRANGEMENT FOR DETECTING THE LENGTH AND THICKNESS OF A PART USING HORIZONTALLY AND VERTICALLY DISPOSED LINE SENSORS

[75] Inventors: Makito Seno, Hirakata; Yoshihiko Misawa, Katano; Makoto Kawai, Neyagawa; Kenichi Sato, Osaka, all of Japan

[73] Assignee: Matsushita Electric Industrial Co., Ltd., Osaka, Japan

[21] Appl. No.: 875,210

[22] Filed: Jun. 17, 1986

[30] Foreign Application Priority Data

Jun. 18, 1985 [JP] Japan ............................... 60-132207

[51] Int. Cl.[4] ............................................ G01B 11/06
[52] U.S. Cl. ...................................... 250/560; 356/381
[58] Field of Search ............... 250/560, 561; 356/383, 356/384, 387, 381, 386; 358/107; 364/560, 562, 563; 901/47

[56] References Cited

U.S. PATENT DOCUMENTS

3,956,629  5/1976  Gomm et al. .................. 250/223 R
4,515,479  5/1985  Pryor ................................. 250/561
4,521,112  6/1985  Kuwabara et al. ................ 356/387

Primary Examiner—David C. Nelms
Assistant Examiner—Stephone B. Allen
Attorney, Agent, or Firm—Wenderoth, Lind & Ponack

[57] ABSTRACT

An attitude detecting arrangement for detecting the attitude of objects such as electronic chip parts and the like, which includes a sensor section having sensors capable of detecting lengths in a horizontal direction and a vertical direction so as to detect the thickness and the length of the object when a portion of light is intercepted by the object held by a suction nozzle, a comparing value memory section in which preliminarily obtained data corresponding to the thickness and length of the object to be detected are stored, and an operation processing section for detecting the attitude of the object to be detected by comparing the data obtained by the sensors with the preliminary obtained data corresponding the thickness and length of the object.

3 Claims, 7 Drawing Sheets

ATTITUDE DETECTING ARRANGEMENT FOR DETECTING THE LENGTH AND THICKNESS OF A PART USING HORIZONTALLY AND VERTICALLY DISPOSED LINE SENSORS

BACKGROUND OF THE INVENTION

1. Field of the Invention

The present invention generally relates to a detecting arrangement and more particularly, to an attitude or posture detecting arrangement for objects, for example, electronic parts or the like, which is capable of positively detecting at high speeds, whether or not the object held by a holding device such as a suction nozzle, etc. is correctly supported or whether or not the object is a correct object as required, with a high detecting reliability.

2. Description of the Related Art

A one example of conventional object attitude detecting arrangements, a part attitude detecting arrangement for a chip type electronic part mounting machine will be described hereinbelow with reference to FIG. 2.

Figure 2:
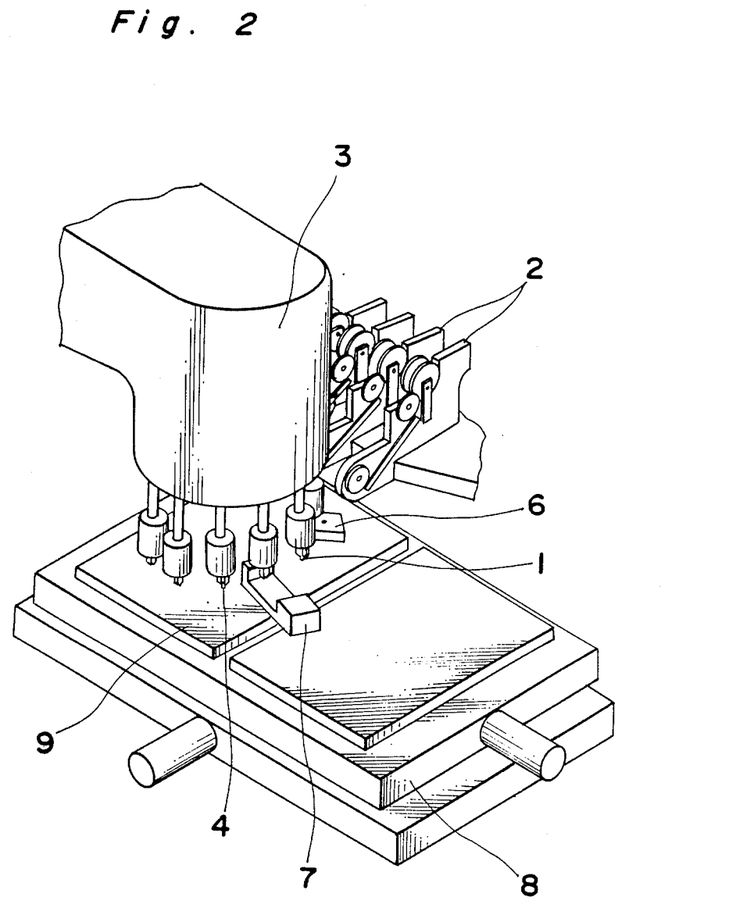
FIG. 2 is a fragmentary perspective view of a chip part mounting machine in which a conventional attitude detecting arrangement is employed (already referred to)

In FIG. 2, the chip-type electronic part 1 (referred to as a chip part hereinbelow) which is an object to be detected is fed from a part supply section 2, and is held, through vacuum attraction, by one of suction nozzles 4 of a mounting head 3 of the machine to be intermittently rotated. Subsequently, after being subjected to a positional adjustment in X and Y directions by an X-Y direction adjusting section 6, the chip part 1 is checked for its attracted attitude by a detector 7, and is transported up to a print circuit board 9 supported on an X-Y table 8 so as to be mounted thereon as required.

Figure 3:
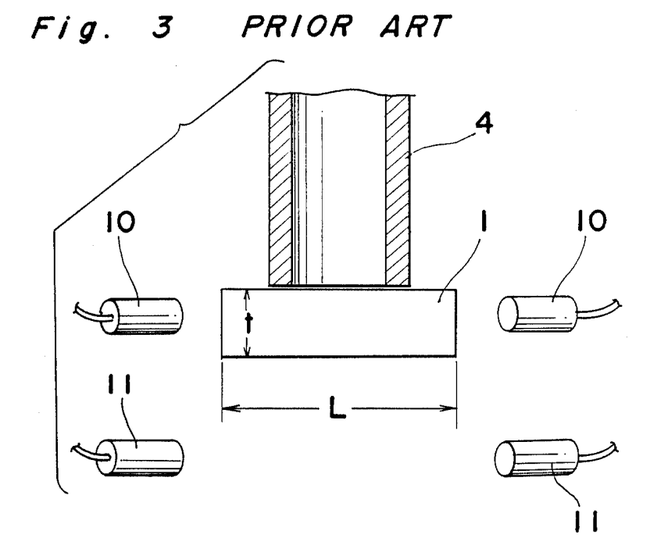
FIG. 3 is a fragmentary side sectional view of a suction nozzle portion of a conventional part attitude detecting arrangement showing a state of operation during normal attraction of the object (already referred to)
Figure 4:
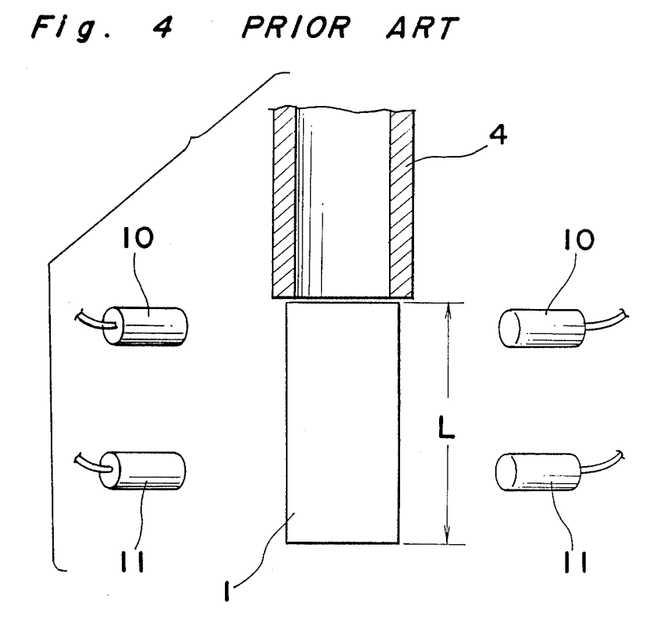
FIG. 4 is a view similar to FIG. 3, which particularly shows a state of operation during an abnormal attraction of the object (already referred to)

Referring also to FIGS. 3 and 4, the attitude detecting method adopted in the conventional detecting apparatus as described so far will be explained. FIG. 3 shows a state in which the chip part 1 is normally attracted onto the suction nozzle 4, while FIG. 4 shows a state in which the chip part 1 is abnormally attracted thereto.

As shown in FIGS. 3 and 4, a pair of light transmitting type photo-sensors 10 and another pair of light transmitting type photo-sensors 11 (referred to merely as photo-sensors hereinafter) are disposed vertically in two stages at opposite sides of the object 1 held by the suction nozzle 4 as illustrated. The pair of spaced photo-sensors 10 are disposed immediately below the suction nozzle 4 for detecting the presence or absence of the chip part 1, while the pair of spaced photo-sensors 11 are disposed in a position that is located under the lower end of the suction nozzle 4 by a distance greater than a thickness t of the chip part 1, but less than a long side L of said chip part 1. In the above-described case, if the photosensors 10 are in the "on" state, the chip part 1 is not present therebetween. Meanwhile, when the photo-sensors 10 are in the "off" state, with the photo-sensors 11 being turned "on", it is indicated that the chip part 1 is normally attracted as shown in FIG. 3. On the contrary, if both pairs of the photo-sensors 10 and 11 are in the "off" state, abnormal attraction of the chip part 1 is determined as illustrated in FIG. 4.

Figure 5A:
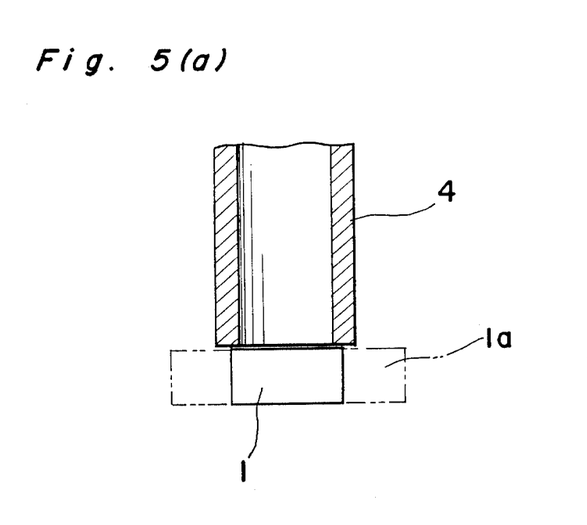
FIG. 5(a) is a fragmentary side sectional view of a suction nozzle portion of a conventional part attitude detecting arrangement showing a state of operation in which the chip part deviates from the proper orientation 90° in a horizontal plane (already referred to)
Figure 5B:
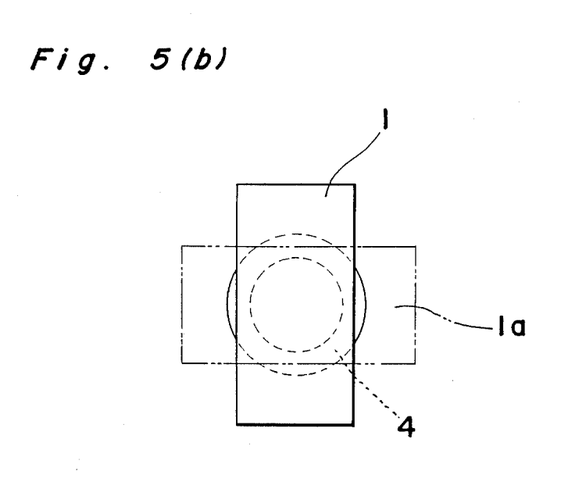
FIG. 5(b) is a top plane view of the suction nozzle portion of FIG. 5(a) (already referred to)

However, the conventional attitude detecting arrangement as described so far has a problem in that, even with respect to the chip part normally attracted onto the suction nozzle 4, if said chip part is incorrectly oriented in a horizontal plane by 90° as is the chip part 1a shown by chain lines in FIGS. 5(a) and 5(b), despite a normal posture thereof in the direction of thickness thereof, it is impossible to effect a correct detection.

SUMMARY OF THE INVENTION

Accordingly, an essential object of the present invention is to provide an improved attitude detecting arrangement for objects such as electronic parts, etc., which is capable of detecting not only an abnormal attraction taking place in the direction of thickness of the object to be detected, but also an incorrect orientation of the object which may occur in a horizontal plane, with substantial elimination of disadvantage inherent in the conventional arrangements of this kind.

Another important object of the present invention is to provide an attitude detecting arrangement of the abovedescribed type, which is simple in construction and functions accurately, and which is readily manufactured at low cost.

In accomplishing these and other objects, according to one preferred embodiment of the present invention, there is provided an attitude detecting arrangement for detecting the orientation of objects, which includes a sensor means having a light emitting portion and a light receiving portion confronting the light emitting portion for receiving light emitted from the light emitting portion so as to be capable of detecting lengths in a horizontal direction and a vertical direction, thereby to obtain data corresponding to of thickness and length of an object by interception of part of the light by the object held by a suction means and inserted between the light emitting portion and light receiving portion, and an operation processing means for detecting the attitude of the object to be detected through comparison of the data obtained by the sensor means with preliminarily obtained data of the thickness and length of the object to be detected.

With the construction according to the present invention as described above, it becomes possible to detect the abnormal attitude of the object in the directions of thickness and length by intercepting light with the object itself to be detected, and through comparison of the data thus obtained and the data preliminarily input.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 6:
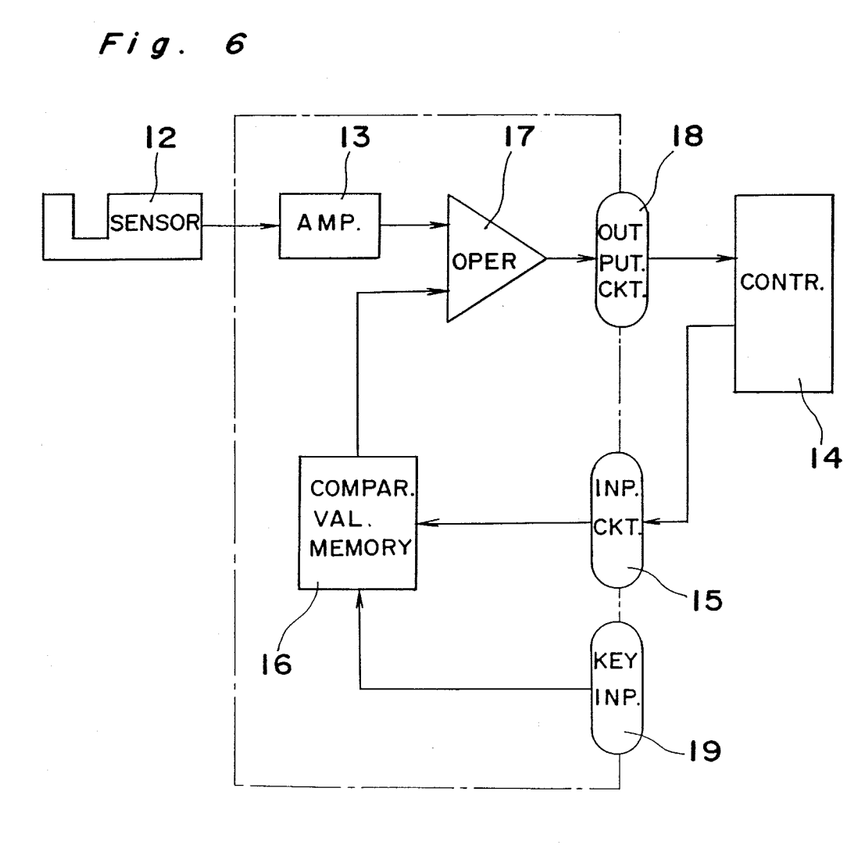
FIG. 6 is an electrical block diagram showing a circuit construction of the part attitude detecting arrangement for a chip part mounting machine according to one preferred embodiment of the present invention.

Referring now to the drawings, there is shown in FIG. 6, an electrical circuit diagram representing a circuit of an attitude detecting arrangement for a chip type electronic part mounting machine according to one preferred embodiment of the present invention. In FIG. 6, the circuit generally includes a sensor section 12 coupled, through an amplifier 13, to an operation processing section 17, whose output is connected to a controller 14 via an output circuit 18. The controller 14 is connected, through an input circuit 15, to a comparing value memory section 16 which is also coupled to the operation processing section 17 and to which a key input section 19 is connected. The sensor section 12 measures the thickness and length of the chip part 1 attracted onto the suction nozzle, and sends the data thereof to the amplifier 13. Meanwhile, data corresponding to the number of the chip parts is simultaneously fed from the controller 14 provided in a main body of the electronic part mounting machine to the comparing value memory section 16 through the input circuit 15, and this comparing value memory section 16 sends out corresponding standard data of thickness and length to the operation processing section 17. The above two data corresponding to thicknesses and lengths are compared at the operation processing section 17, and the result is judged and fed to the controller 14 in the main body of the mounting machine through the output circuit 18. The key input section 19 is for inputting the standard data for the thickness and length of the chip part.

Figure 7A:
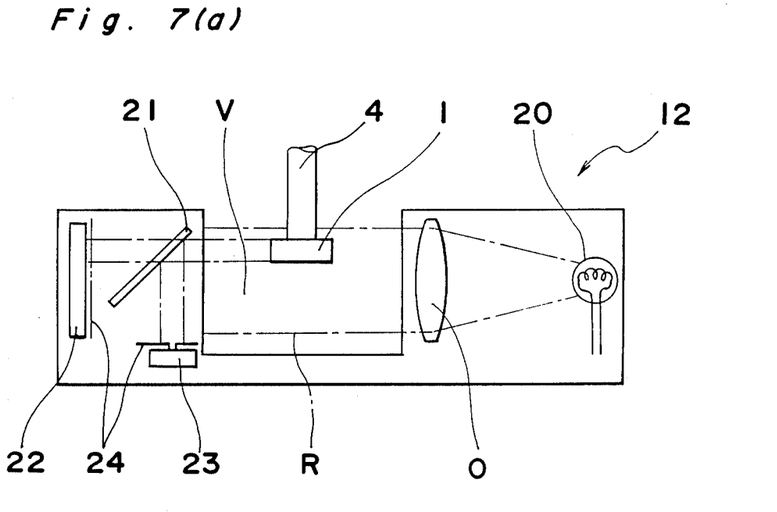
FIG. 7(a) is a schematic side sectional view of a sensor portion employed in the arrangement of FIG. 6.
Figure 7B:
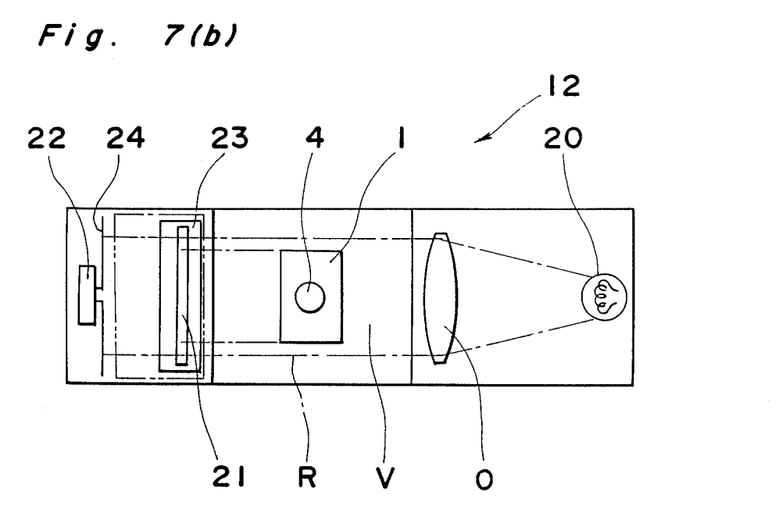
FIG. 7(b) is a top plan view of the sensor portion of FIG. 7(a)

Referring also to FIGS. 7(a) and 7(b), the construction of the sensor section 12 will be explained. The sensor section 12, for example, has a rectangular box-like configuration and is provided therein with a groove or recess V having a width sufficient to receive the suction nozzle 4 and the chip part 1. In the sensor section 12 behind one side wall of the groove V, a light source 20 and a lens O are disposed to emit parallel light rays R, while, after within the other side wall of the groove V, line sensors 22 and 23 are respectively embedded and extend in horizontal and vertical directions to confront the light source 20 through a half mirror 21.

Each of these line sensors 22 and 23 is of a charge coupled device (CCD) of one dimensional type which may be used as an image pick-up element. On the light receiving surface of each sensor, there are arranged a large number of sensor elements (not particularly shown), each of which is capable of emitting a signal indicating whether or not light from the light souce 20 is received thereby. Therefore, when an object, for example, the chip part 1 is introduced between the light source 20 and the line sensors 22 and 23, the light is shielded by the object and casts a shadow on the light receiving surface of the sensor, and by sequentially scanning the sensor elements at this time, the number of sensor elements that are covered by the shadow can be determined. For preventing unnecessary light from entering the line sensors 22 and 23, slits 24 are provided therefor as shown.

Figure 1:
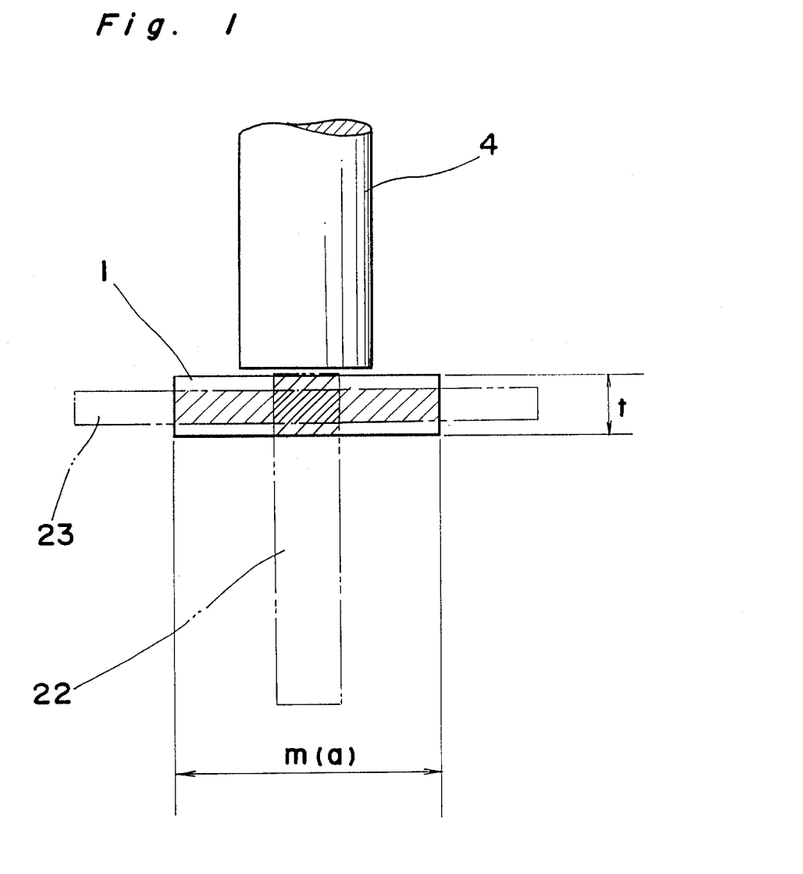
FIG. 1 is a schematic side elevational diagram of an attitude detecting arrangement illustrating the operation principle of detection according to one preferred embodiment of the present invention.

In FIG. 1, the relation between the state of attraction of the chip part 1 on the suction nozzle 4 and the light receiving portions of the line sensors 22 and 23 is shown. In the direction of thickness, the length of the portion shielded by the vertically disposed line sensor 22 represents the thickness t of the chip part 1. Meanwhile, with the horizontally disposed line sensor 23, the length m(a) i.e., length a of one side of the chip part 1 can be measured. Thus, the state of the chip part may be judged "normal" if the data for the thickness t and length m(a) are within predetermined allowances upon comparison thereof with preset data, or the state may be judged "abnormal" if they exceed the preset data.

Figure 8:
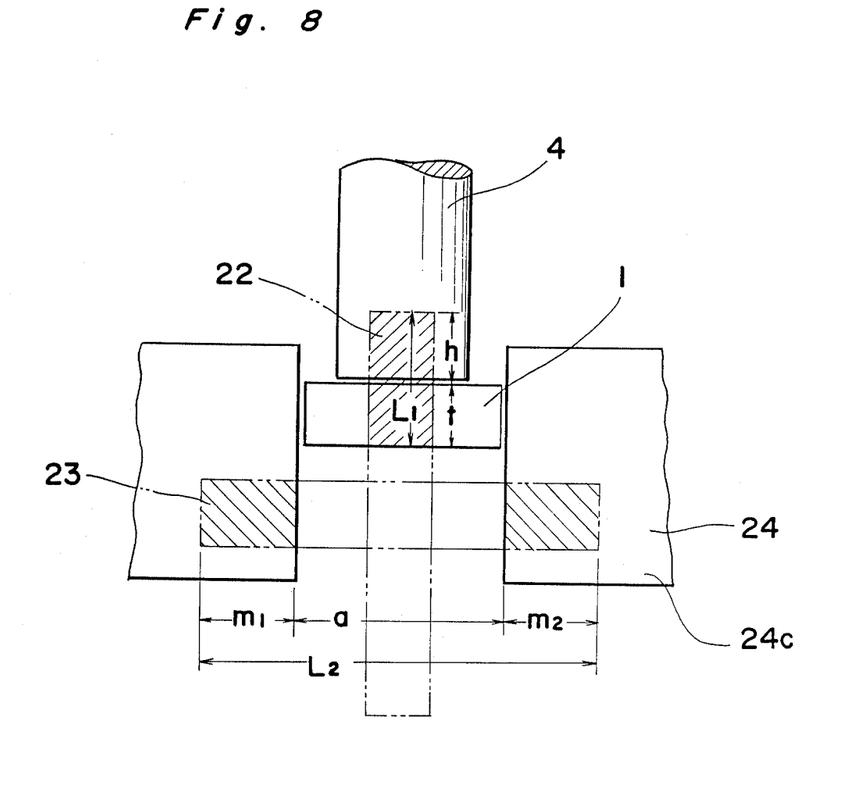
FIG. 8 is a fragmentary side sectional view of a part attitude detecting arrangement according to a second embodiment of the present invention.

Referring further to FIG. 8, the part attitude detecting arrangement, according to a second embodiment of the present invention described hereinbelow, is adapted to subject the chip part 1 attracted and held by the suction nozzle 4 to positional adjustment by a pair of confronting chuck jaws 24c of a chuck 24. In this arrangement, it is impossible to directly measure the length of the chip part 1 in the horizontal direction by transmitting light rays due to the presence of jaws 24c of the chuck 24.

In the above-described case, the line sensor 23 extending in the horizontal direction is disposed under the chip part 1 in a position lower than a thickness t of the chip part 1, and a length obtained by subtracting lengths m1 and m2 of the portions shielded by the jaws 24c of the chuck 24, from the length L2 of the sensor 23, represents the length a of the chip part 1.

With respect to the thickness direction, the thickness t of the chip part 1 may be represented by a length obtained by subtracting the set height h of the suction nozzle 4 from a length L1 of the portion shielded by the vertically disposed line sensor 22.

As is clear from the foregoing description, according to the present invention, since the attitude detecting arrangement includes the sensor section having the light source and sensors capable of detecting lengths in the horizontal direction and vertical direction so as to detect the thickness and length of the object due to the shielding of light by said object held by the suction nozzle and entering between the sensors, the comparing value memory section in which preliminarily obtained data of the thickness and length in the horizontal direction of the object to be detected are respectively stored, and the operation processing section for judging whether or not the object is correctly held or the object is a correct one as required, it is possible to determine the presence of the attracted object to be detected, state of the posture of the attracted object, and furthermore, whether determine or not such attracted object is the correct one as required.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. An attitude detecting apparatus for detecting the attitude of objects, said apparatus comprising:

a light emitting portion for emitting light;

a lens means through which the light emitted by the light emitting portion passes, said lens means for focussing the light into parallel light rays;

holding means for holding an object in the path of the light so that the object intercepts at least a portion of the light;

a light receiving portion comprising a first and a second line sensor which extend in respective directions that are perpendicular to one another, and a half mirror facing said lens so as to receive a remaining portion of the light after the light has been focused by the lens means and intercepted by the object, said half mirror located at a position with respect to said line sensors at which said remaining portion of the light passing therethrough is incident on said first line sensor and said remaining portion of the light reflected thereby is directed onto said second line sensor so that a shadow cast by the object corresponding to the length of the object is effected on one of said line sensors and a shadow corresponding to the thickness of the object is effected on the other of the line sensors; and an operation processing means for receiving data corresponding to the length and the thickness of the object held by the holding means from said line sensors to determine the attitude of the object.

2. An apparatus as claimed in claim 1, wherein said holding means comprises a suction nozzle.

3. An apparatus as claimed in claim 2, wherein said holding means further comprises a chuck having chuck jaws for grasping the object along a predetermined portion extending along the length thereof.

* * * * *